US012294650B2

(12) United States Patent
Coffing (10) Patent No.: US 12,294,650 B2
(45) Date of Patent: May 6, 2025

(54) DYNAMIC AUTHORIZATION AND ACCESS MANAGEMENT

(71) Applicant: Cloudentity, Inc., Seattle, WA (US)

(72) Inventor: Nathanael Coffing, Seattle, WA (US)

(73) Assignee: SecureAuth Corporation, Irvine, CA (US)

( * ) Notice: Subject to any disclaimer, the term of this patent is extended or adjusted under 35 U.S.C. 154(b) by 323 days.

(21) Appl. No.: 17/575,540

(22) Filed: Jan. 13, 2022

(65) Prior Publication Data

US 2022/0224535 A1 Jul. 14, 2022

Related U.S. Application Data

(60) Provisional application No. 63/137,423, filed on Jan. 14, 2021.

(51) Int. Cl.
*H04L 9/32* (2006.01)
*H04L 9/40* (2022.01)

(52) U.S. Cl.
CPC .......... *H04L 9/3213* (2013.01); *H04L 63/101* (2013.01); *H04L 63/102* (2013.01); *H04L 63/205* (2013.01)

(58) Field of Classification Search
USPC ............................................. 726/6
See application file for complete search history.

(56) References Cited

U.S. PATENT DOCUMENTS

2012/0072979 A1* 3/2012 Cha .................... H04W 12/069
726/8
2020/0013060 A1* 1/2020 Coffing ................ H04L 63/102

* cited by examiner

*Primary Examiner* — Brandon Hoffman
(74) *Attorney, Agent, or Firm* — ROARK IP (57) ABSTRACT

A system that uses an enriched token to dynamically authorize and/or manage access to endpoint(s). The enriched token defines a scope of access with respect to the endpoint(s) and may be generated based at least in part on user context information obtained from an identity provider.

19 Claims, 7 Drawing Sheets

DYNAMIC AUTHORIZATION AND ACCESS MANAGEMENT

CROSS REFERENCE TO RELATED APPLICATION(S)

This application claims the benefit of U.S. Provisional Patent Application No. 63/137,423, filed on Jan. 14, 2021, which is incorporated herein by reference in its entirety.

BACKGROUND

Technical Field

The present technology generally relates to access management. More specifically, the present technology relates to dynamic authorization and data lineage and zero-trust within an Application Programming Interface ("API") based architecture.

Description of the Related Art

Modern-day consumers have ever-increasing expectations that their service providers serve them in customized, efficient, and secure fashion. As such, even enterprises that have not traditionally been considered technical are now facing urgent technological demands in order to serve their customers. Such enterprises may rely on presently available authorization and access management systems to authenticate and authorize certain users to access certain resources or services. Such an endeavor may become increasingly complicated, however, as enterprise systems and the resources and service provided become more complex, subject to more regulation, and/or targeted for theft, exposure of privacy data, or other kinds of dynamic attacks.

Moreover, the information technology environment is continually evolving, and security challenges have become more difficult in view of recent trends like bring-your-own-device, cloud computing, mobile applications, Internet of Things ("IoT"), prioritizing user experience, and an increasingly mobile workforce. There are more devices and services to be managed than ever before, along with diverse requirements for associated access privileges. As individuals migrate through different roles in an enterprise or the customer experience, it becomes increasingly complex and challenging to manage authorizations and ensure appropriate access to resources across progressively more heterogeneous technology environments. Such technical challenges may arise from the different types of information to be tracked, different policies to be enforced, and the distributed data storage systems from which that information may be managed, updated, and retrieved. Further complicating the challenge is the expectation of a certain standard of customer service, delivery of tailored customer experiences in real-time (or near real-time), and that such software features will continue to stay abreast with the current technical environment, which may rapidly develop and improve over time.

Further, many presently available authorization and access management systems are part of large monolithic systems and/or are monolithic themselves. Such monolithic enterprise systems are generally inflexible, unagile, and as a result, slow to adapt and respond to change. Moreover, such monolithic legacy architectures may further lack scalability, face increased times to market, increased acceptance testing requirements, and are unable to manage security risks in any tailored way. This is compounded by the advent of new standards and types of Identity. Service Identity, Workload Identity and IOT thing Identity are all required as part of a transaction's security posture. Developing and deploying updates, for example, in such systems may require extensive development and testing times that leave the system outdated and vulnerable in the interim. In particular, monolithic authorization and access management systems may become highly strained when tasked to operate with rapidly growing microservices architectures. Increasingly, however, many new applications are being developed as microservices, which heighten the need for authorization and access management systems capable of managing security of application-to-application (A2A) or workload-to-workload transactions. This is because with the current state of the art, once an access token, key or session ID of one of the microservice is leaked, an unrestricted access to all the microservices may ensue because identities or authorizations are not verified again after initial access is granted by an API gateway. Thus, there is a need to provide secure access to and between each endpoint.

In addition, different business groups or departments within a single company may be responsible for dealing with different types of transactions, and as such, may develop discrete authorization and access management tools specific to their particular needs and transaction requirements. A company with many different departments may lack a unified set of security policies or even a unified set of records (e.g., a single user may be associated with multiple different records from different departments).

Moreover, such legacy authorization and access management systems are not equipped or only ill-equipped to interact securely with the cloud, which decreases their speed, efficiency, and flexibility. Such systems further lack the ability or face serious obstacle in using or integrating with existing modern-day cloud-based tools and resources.

Further, those services that utilize microservice architecture lack dynamic and rich distributed security policy enforcement of authorization verification to each microservice. Security policies are not varied for each microservice, thus rendering other microservices vulnerable to breach in security if one of the microservices is compromised. Moreover, the security policies for the microservices are not easily updated or changed without extensive development effort.

There is therefore a need in the art for improved systems and methods for authorization and access management.

DETAILED DESCRIPTION

Techniques for dynamic authorization may be used to deliver authorization and access management systems utilizing microservices architecture to access protected data of an API.

Rich policies to access each endpoint such as an API or microservice may be defined by the dynamic access and management system. Moreover, the system allows dynamic security management of access to each part or function of an API or a microservice. In addition, policies are able to constrain or augment existing identity related data to ensure each service gets only the data it needs to transact that function. The intelligent authorization system may be deployed in a hybrid-cloud or multi-cloud environment that includes services or microservices.

Figure 1:
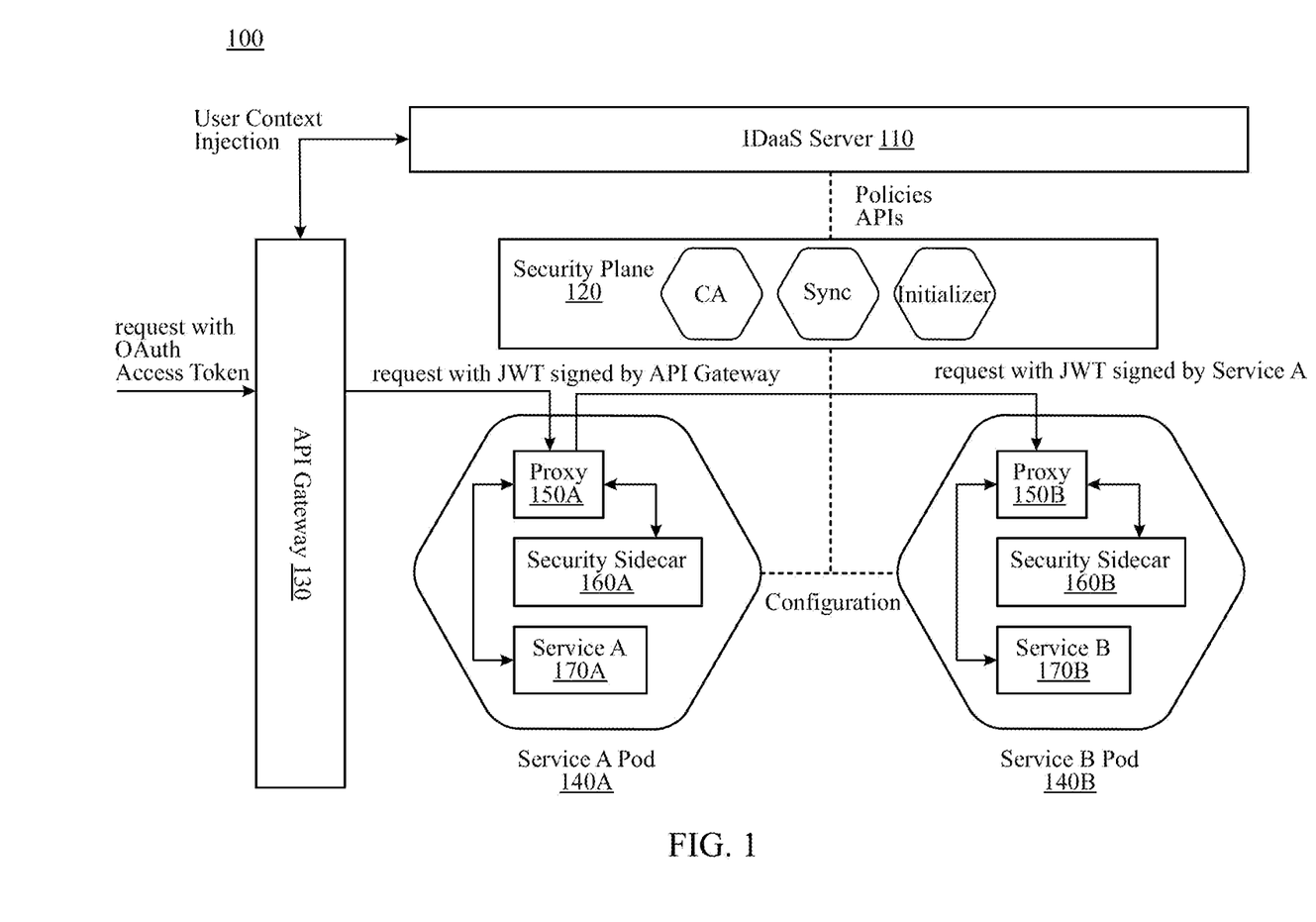
FIG. 1 illustrates a simplified network environment in which systems for microservices-based authorization and access management may be implemented.

FIG. 1 illustrates a simplified network environment 100 in which systems for microservices-based authorization and access management may be implemented. As illustrated, an exemplary system may include an identity-as-a-service ("IDaaS") server 110, a security plane 120, an API gateway 130, and one or more service pods 140 that deploy microservices. In the embodiment illustrated, the service pod(s) 140 include a service A pod 140A and a service B pod 140B. Each service pod 140 may further each include a proxy 150, a security sidecar 160, and a respective code or application 170 for providing a respective service.

The IDaaS server 110 may provide a platform for managing microservices, Open Authorization ("OAuth") applications, multi-tenant identity, authorization, and authentication with delegation and administration features. The IDaaS server 110 may be installable in the cloud or on-premises and used to the control security plane 120 in an all microservice environment.

The security plane 120 is illustrated as including a Certificate Authority ("CA"), Sync, and Initializer modules. The CA (e.g., Vault) may allow for reading and generation of dynamic digital certificates corresponding to security keys corresponding to service/workload/OAuth based API identity. The Sync allows for registration and correlation of a Secure Production Identity Framework for Everyone ("SPIFFE") based workload identity, OAuth based API Identity, and policies associated with the AP I/Microservice, as well as synchronization of policies and APIs configuration. The Initializer allows for injection of a proxy 150A-B and security sidecar 160A-B into the respective service A and B pods 140A-B, as well as triggers generation of a new digital certificate upon deployment or rotation of digital certificates depending on secret longevity.

The API gateway 130 may serve as an entry point to a service mesh, multiple interconnected microservices. A service mesh API gateway 130 may expose public endpoints using OAuth token for authentication and inject user context via a token (e.g., a JSON Web Token ("JWT")) to proxied requests signed using a private key issued exclusively for the API gateway 130 by internal CA in the security plane 120. The API gateway 130 can enforce rich policies that can be created in the IDaaS server 110 based on such factors as user attributes, roles, relationships, session attributes, current location, device information, authentication methods used, and risk factor of a transaction user or a device.

The service pods 140 may be any type of microservice known in the art. As mentioned above, each service pod 140 includes a proxy 150, a security sidecar 160, and code or application 170 specific to each microservice. In the embodiment illustrated, the service pod(s) 140 include(s) the service A pod 140A and the service B pod 140B. Also, in the embodiment illustrated, the service A pod 140A includes the proxy 150A, the security sidecar 160A, and the code or application 170A. Similarly, in the embodiment illustrated, the service B pod 140B includes the proxy 150B, the security sidecar 160B, and the code or application 170B.

The proxy 150 may be any intelligent Hypertext Transfer Protocol ("HTTP") proxy that provides dynamic service discovery, load balancing, circuit breakers, traffic routing, metrics and more. Such proxies 150 may be extended with a plugin that calls the security sidecar 160 to validate and transform requests.

The security sidecar 160 allows in-place validation of policies (enforcement and decisions) for incoming requests and transformation of outgoing requests. In certain default scenarios, the security sidecar 160 may validate if incoming requests were signed using a key generated by internal CA and inject a token (JWT)-signed using a private key of a microservice. The user context may be propagated, abridged or augmented depending on policy between microservices via minting or updates to the JWT.

Figure 2:
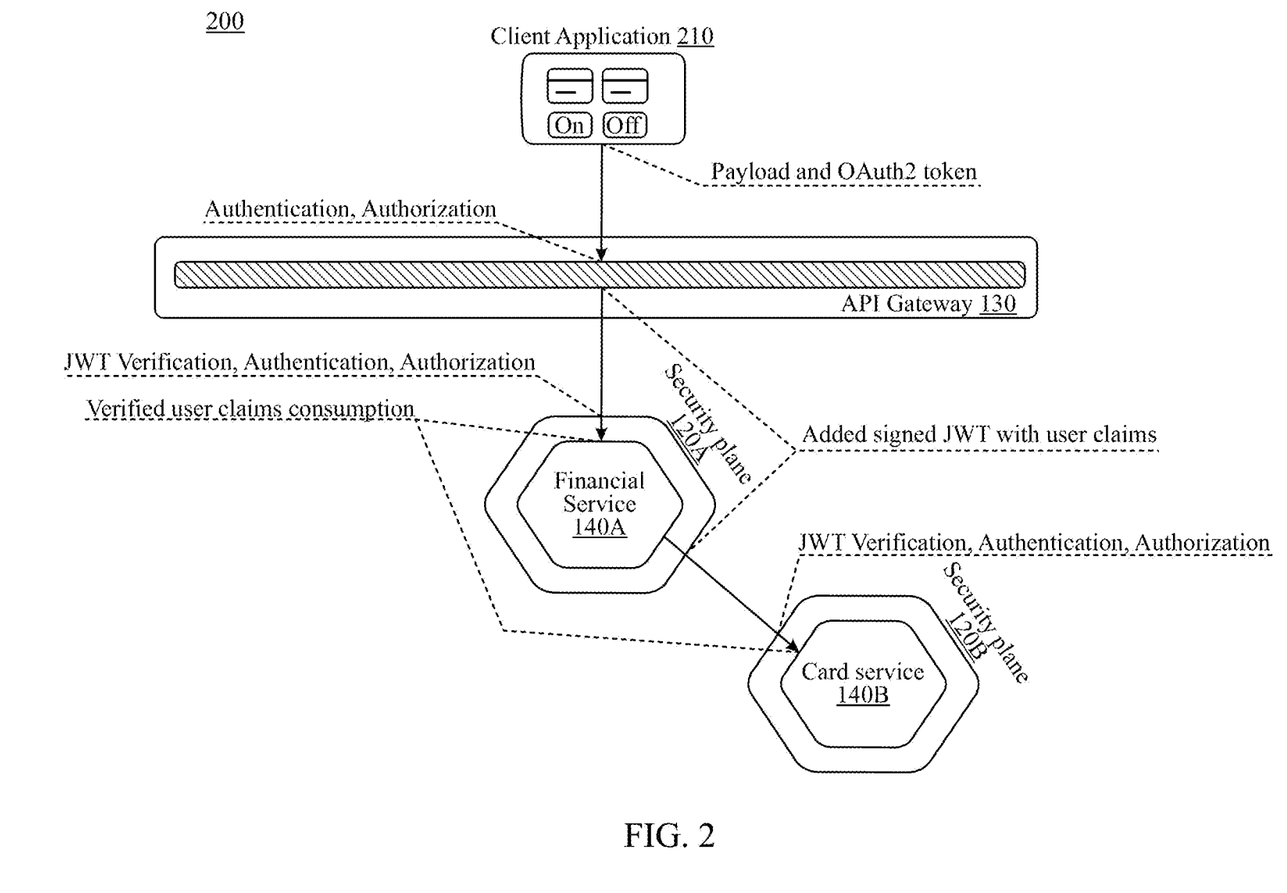
FIG. 2 illustrates an exemplary network environment in which systems for microservices-based authorization and access management may be implemented.

FIG. 2 illustrates an exemplary network environment 200 in which systems for microservices-based authorization and access management may be implemented. Building upon the basic components discussed in relation to FIG. 1, the network environment 200 is illustrated as further including a client application 210, the API gateway 130, and the service A pod 140A and the service B pod 140B (referred to as microservices 140A-B) with the respective security planes 120A-B. As illustrated, one microservice 140A may correspond to certain financial services, while the other microservice 140B may correspond to credit card services. Although only two microservices 140A-B are illustrated, service meshes may include any number of further microservices. For example, microservices 140A (financial services) may call a number of further microservices 140B-N and expose a number of types of APIs.

The client application 210 may be a web application that may be accessible and visible via a web browser. Such a client application 210 may trigger a request (e.g., by a button click). Such request may contain a payload and the access token (e.g., in the request header). The API gateway 130 may authenticate the call and perform authorization, not only checking the scope of authorizations but also invoking all other policies associated with the API. Upon successful authentication and authorization, the request may then be proxied to the appropriate microservice 140 in the mesh with an added JWT token that has been enriched with user data (e.g., from payload). Since the API gateway 130 is a microservice itself, the API gateway 130 may be aware of other microservices 140A-N in the network. The API gateway 130 may further sign the JWT token with its individual private key (e.g., generated with Vault), so that other microservices can verify the signed JWT token and identify the microservice.

Each microservice 140A may be secured by a respective security sidecar (e.g., the security sidecar 160 of FIG. 1). Each incoming and outgoing request may be proxied (e.g., through Linkerd™ Proxy) before reaching a target microservice 140 or going outside of a microservice 140. The proxy may use a security plugin to validate each incoming request and to transform each outgoing request. An exemplary incoming request may be received by the proxy, which may then call on the security sidecar 160 to validate a request or a token exchange service to augment the request. The security sidecar 160 may look for a policy rule that matches the request and then validate one or more policies for the request. The security sidecar 160 may further check if the incoming JWT token is valid and signed using the key that was issued by the Certificate Authority (Vault). The proxy may evaluate the validation result. When authorized, the proxy may then provide the request to the target microservice 140. When unauthorized, the proxy may return a 401 HTTP status.

Outgoing requests may likewise be proxied. The proxy may call the security sidecar 160 to transform an outgoing request. The security sidecar 160 may then execute a chain of HTTP request transformers. By default, the security sidecar 160 may inject a JWT token signed using the private key that is assigned to the target microservice 140 as an HTTP header. The proxy may then modify the outgoing request.

Figure 3:
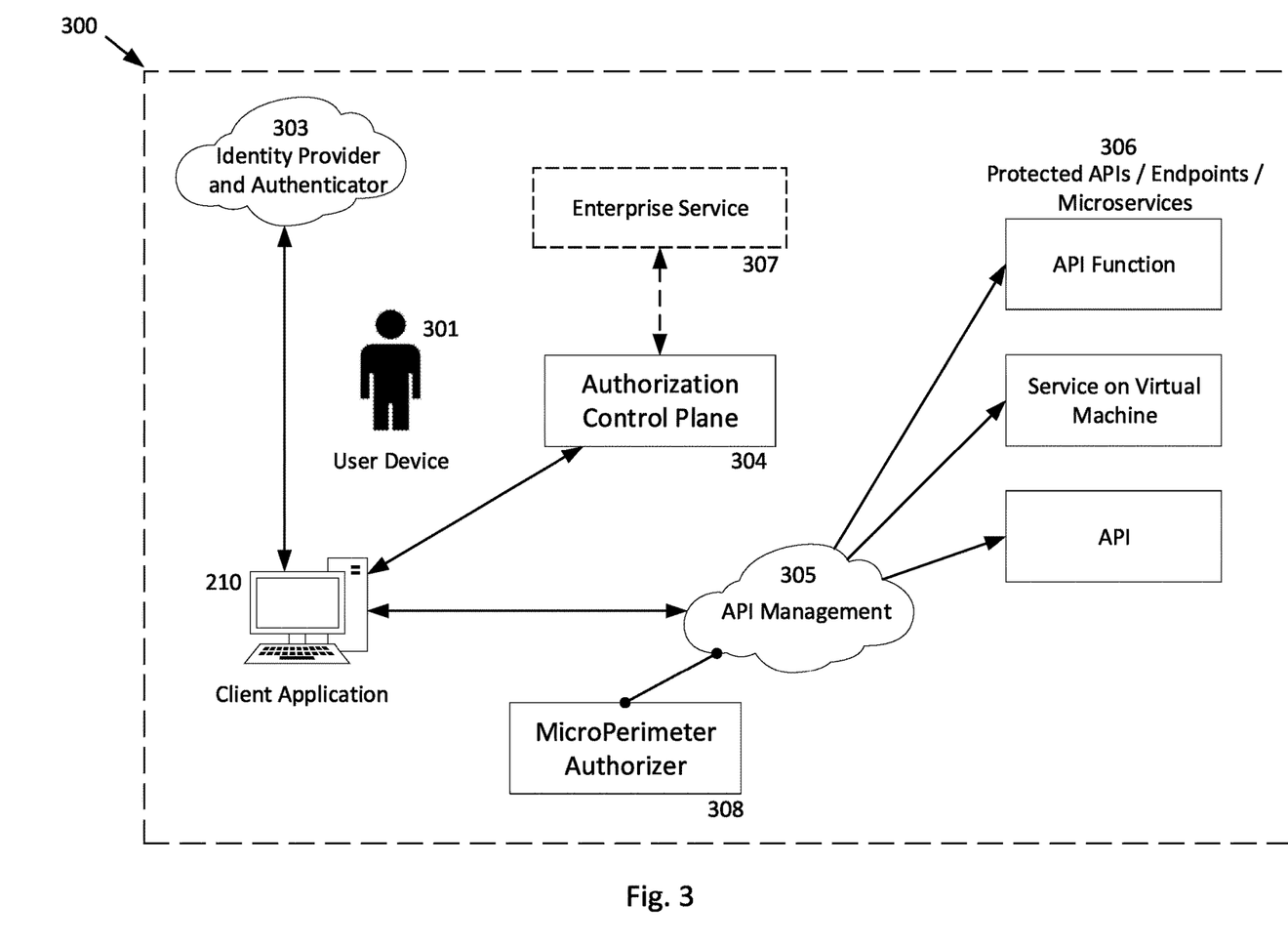
FIG. 3 is a block diagram of an exemplary authentication and authorization system with a network architecture.

FIG. 3 is a block diagram of an exemplary authentication and authorization system with a network architecture. As illustrated, an exemplary network environment 300 may include a variety of different entities, including a user device 301, a client application 210, an identity provider and authenticator 303, an authorization control plane 304, an API management 305, one or more APIs 306, and an enterprise service 307.

A user may utilize the user device 301 to request access to secured data retrieved from the protected API(s) 306 in the network environment 300. The user device 301 may be any number of different electronic devices, such as general purpose computers, mobile phones, smartphones, smartwatches, wearable devices, personal digital assistants ("PDAs"), portable computing devices (e.g., laptop, netbook, tablets), desktop computing devices, handheld computing device, smart sensors, smart appliances, IoT devices, devices networked to controllers for smart control, servers and server systems (including cloud-based servers and server systems), or any other type of computing device capable of communicating over a communication network. Such user device 301 may also be configured to access data from other storage media, such as local caches, memory cards, or disk drives as may be appropriate in the case of downloaded services. The user device 301 may include standard hardware computing components such as network and media interfaces, non-transitory computer-readable storage (memory), and processors for executing instructions that may be stored in memory. In some instances, the user device 301 may communicate with identity provider over communication network via an API gateway associated with a cloud-native application. Such an API gateway may serve as an entry point for the user device 301 to a service mesh.

The user device 301 may express intent to access certain information via the client application 210. To access the information, the user may be required to authenticate the identity of the user via the identity provider and authenticator and authenticator 303, such as Okta, OAuth OpenID, FIDO, biometric signatures, and Facebook. The identity provider and authenticator 303 may render a user identification via the IDaaS Server 110 as illustrated in FIG. 1.

The identity provider and authenticator 303 creates, maintains, and manages identity information of users. The identity provider and authenticator 303 may store user credentials, such as login ID and password, and a user profile that includes information relevant to granting access to the user. Such relevant information may include user attributes, user roles, and user relationships. The identity provider and authenticator 303 may allow exchange of user credentials to other services in response to an authentication request of an authenticated user.

The client application 210 receives the request from the user device 301 and forwards the request to the authorization control plane 304. The authorization control plane 304 provides for a bridge between identity, API management, and microservice mesh realms. By bridging identity, API Identity, Workload Identity, Authorization policies and microservice mesh, such a system gives companies and enterprises the ability to build truly secure distributed API driven microservices environment with proper controls as needed and with end-user identity context passed to microservices for a customized user experience.

The authorization control plane 304 may function similarly to the security plane 120 as illustrated in FIG. 1 to generate a token associated with the request to access data from protected APIs and enrich the token based on the context data of the requesting user. The authorization control plane 304 may further communicate with the enterprise service 307 to verify whether user may be granted access to the data from protected APIs. The authorization control plane 304 may also store security policies regarding accessing APIs, store user context received from the identity provider and authenticator 303, store user requests for data from APIs and user consents, define how a user may be authorized and authenticated, select proxy and security sidecar associated with each API, and store rules regarding how a sidecar may grant access to each APIs by requesting additional context validation.

The API management 305 may include the API gateway 130 and a microperimeter authorizer 308. As illustrated in FIG. 1, the API gateway 130 provides a first access to the microservices mesh by intercepting an enriched token from the client application 210 (see FIGS. 2 and 3), signing the enriched token, and passing the signed token to the microperimeter authorizer 308 (see FIG. 3). The API gateway 130 may expose public endpoints for identification and authentication, as well as inject into a data stream contextual data (e.g., via a token to proxied requests signed using a private key issued exclusively for the API gateway (e.g., by an internal certificate authority in a security plane)).

The microperimeter authorizer 308 defines different factors to authenticate and authorize the user for accessing each of the API(s) 306 that can be utilized by the respective security sidecar (e.g., security sidecar 160 of FIG. 1) of each of the associated API(s) 306. The factors may include user attributes, roles, relationships, session attributes, current location, device information, authentication methods used, and risk factor of a transaction user or a device. Moreover, the scope of access may be varied by the microperimeter authorizer 308 according to different user attributes, roles, relationships, session attributes, current location, device information, authentication methods used, and risk factor of a transaction user or a device to provide for the enforcement of rich policies. For example, an officer of an organization may be given different scope of access than an employee of the organization. Further, the microperimeter authorizer 308 may vary the numbers of factors to verify user identity to determine scope of accessing each API or microservice. The defined policies for accessing each API may be easily and dynamically changed on an interface of the API management 305. To enforce the multi-factor authentication and authorization to each API, identity of the user is verified by each security sidecar associated with each API at every instance each API or microservice is invoked.

The microperimeter authorizer 308 may be deployed in different embodiments, such as microperimeter gateway, microperimeter sidecars, or packaged Red Hat Package Management ("RPM") plug-ins. Different embodiments of deployment may be used depending on the API infrastructure.

Figure 5:
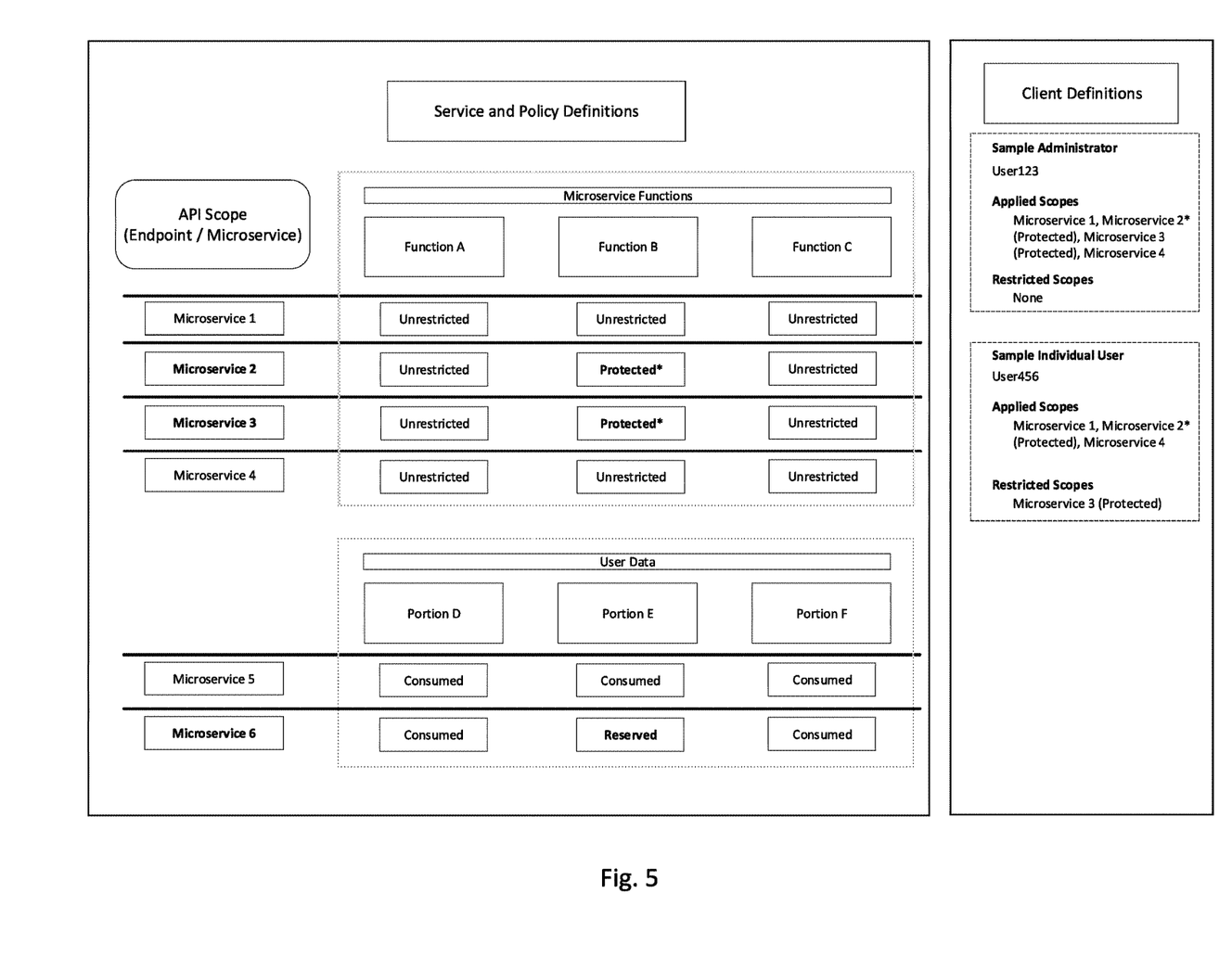
FIG. 5 illustrates an interface of API management system of the dynamic authorization system.

The API management 305 may utilize an interface to configure the security policies and permissions for user access to each API and microservice, as illustrated in FIG. 5.

Referring to FIG. 3, the enterprise service 307 is an external source of data and may be queried by the authorization control plane 304 to provide the user an access to the data stored in the enterprise service 307.

Figure 4:
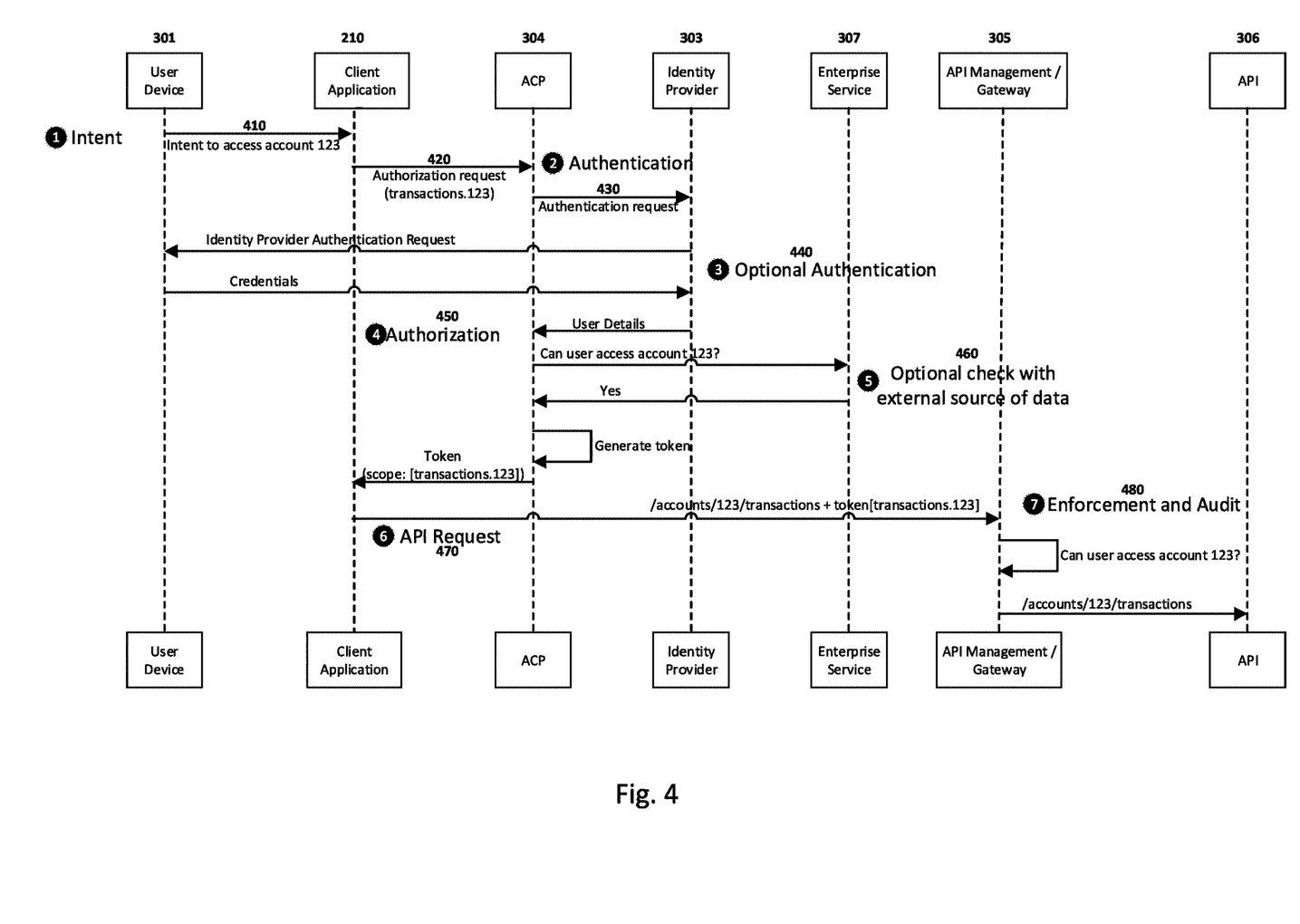
FIG. 4 is a flow diagram illustrating an exemplary dynamic authorization system.

FIG. 4 is a flow diagram illustrating an exemplary dynamic authorization system.

At step 410, a user device 310 expresses an intent to access desired information that the client application 210 may provide. For example, the desired information may be transaction information utilized by the client application 210, such as a digital wallet application (Paypal, Venmo, Digit, etc.). The desired information is protected such that the user needs to be authenticated in order to access the desired information. The client application 210 receives the intent of the user to access its information and sends an authorization request to authorize the user to the authorization control plane 304 at step 420. At step 430, the authorization control plane 304 transmits the received authentication request to the identity provider and authenticator 303.

At step 440, the identity provider and authenticator 303 may request credentials from the user device 301 by prompting the user device 301 to enter the credentials, such as a log-in name and a password or biometrics, which the user has previously established with the identity provider and authenticator 303. In an alternate embodiment, the user may not have an established credentials with the identity provider and authenticator 303 and may need to provide additional information, such as name of the user, an email address of the user, or other personal information of the user in order to establish a user profile and credentials to be authenticated. In either case, the received credentials of the user is used to authenticate the user. Step 440 may be optional if the user has already been authenticated previously by the identity provider and authenticator 303.

At step 450, the identity provider and authenticator 303 returns stored user details to the authorization control plane 304. For example, the user detail may include a profile information of the user, user attributes, location of the user, originator of the transaction, and frequency at which the user accesses the desired information. The authorization control plane 304 generates a token for a defined scope to grant access to the desired information and enriches the token with the user details. In some embodiments, the user details may be referred to as user context. The token is then transferred to the client application 210.

In some embodiments, the enterprise service 307 may be utilized by the client application 210 to store data accessible via the client application 210. For example, information utilized by a digital wallet application may be stored in a database of a bank. In such a case, the bank is an enterprise service. If the desired information requested by the user device 301 from the client application 210 is stored at the enterprise service 307, the authorization control plane 304 may query the enterprise service 307 whether the user device 301 may be granted access to the desired information at step 460. The enterprise service 307 verifies whether the user device 301 may be granted access to the desired information and relays the verification information back to the authorization control plane 304.

At step 470, the client application 210 sends a request to access the desired information to the API management 305 that serves as an entry point to a particular one of the API(s) 306. This request includes the enriched token from step 450 and an API call to the particular API, referred to as an API endpoint. For example, the request may include an API path, such as "/account/123/transactions," for the API management 305 to search for transactions at an account 123.

At step 480, the API management 305 verifies whether the user has authorization to access the desired information from the particular API by validating the enriched token received from the client application 210. The particular API may contain data retrievable from endpoints or microservices. If the API management 305 verifies the user identity using the enriched token and determines that the user has authorization to access the desired information, the request to access the desired information is sent to the particular API to retrieve the desired information.

FIG. 5 illustrates an interface of an API management system of the dynamic authorization system. The interface may be utilized for security policy management of endpoints, such as API and microservices. For each microservice, different authorization policy may be set for different parts of API. Functions A, B, and C of FIG. 5 may be different parts of an API or microservice, or different privileges given to a user. In one embodiment, A, B, and C may refer to discrete user actions that the user may be granted by the API or the microservice, such as downloading, deleting, uploading data from the API or microservice.

As seen on FIG. 5, microservice 1 and 4 do not assign any restrictions to access or utilize Functions A, B, and C of the microservice 1 and 4. Function B of microservices 2 and 3 is protected, which may require the user to be authorized in order to access or utilize Function B of microservices 2 and 3.

The API management system may further be used to assign and propagate different scope of access to different users. Client definition may be defined differently for each user based on different user attributes as seen on FIG. 5. For example, a sample administrator, User123, has access to microservices 1, 2, 3, and 4, including all protected functions. Another sample individual user, User456, has access to all functions of microservices 1, 2, and 4, and Functions A and C of microservice 3. User456 does not have access to Function B of microservice 3. Moreover, it is possible to dynamically further refine the access privileges using transactional attributes of the request from a user. For example, User123 may be denied access to functions A and C of microservice 3 if the request of User123 is coming from a TOR network.

Further, same security policies for accessing a certain API may be set for a group of similar users. For example, all administrators may be given similar scope of access to the APIs or microservices. Alternatively, the scope of access for administrators may vary slightly for different administrators but remain vastly different from the scope of access for an individual user.

Thus, the API management system allows modification of permissions to who can access different parts of an API.

In another embodiment, the API management system may be used to constrain the portions of user data to which each microservice has access. User data associated with a user requesting endpoints may be received by the system from the user device 301, the identity provider and authenticator 303, the enterprise service 307, or other database to access the endpoints. Only some portions of this user data may be needed by each microservice. FIG. 5 illustrates Portions D, E, and F of user data received by the system as displayed on the API management interface. Microservice 5 may have access to Portions D, E, and F of the user data, whereas Microservice 6 may only have access to Portions D and F of the user data. The system may further keep a record of the data lineage regarding where the user data was received from (e.g., identity provider or enterprise service) and which microservices are consuming such user data and display the data lineage in the API management interface.

Figure 6:
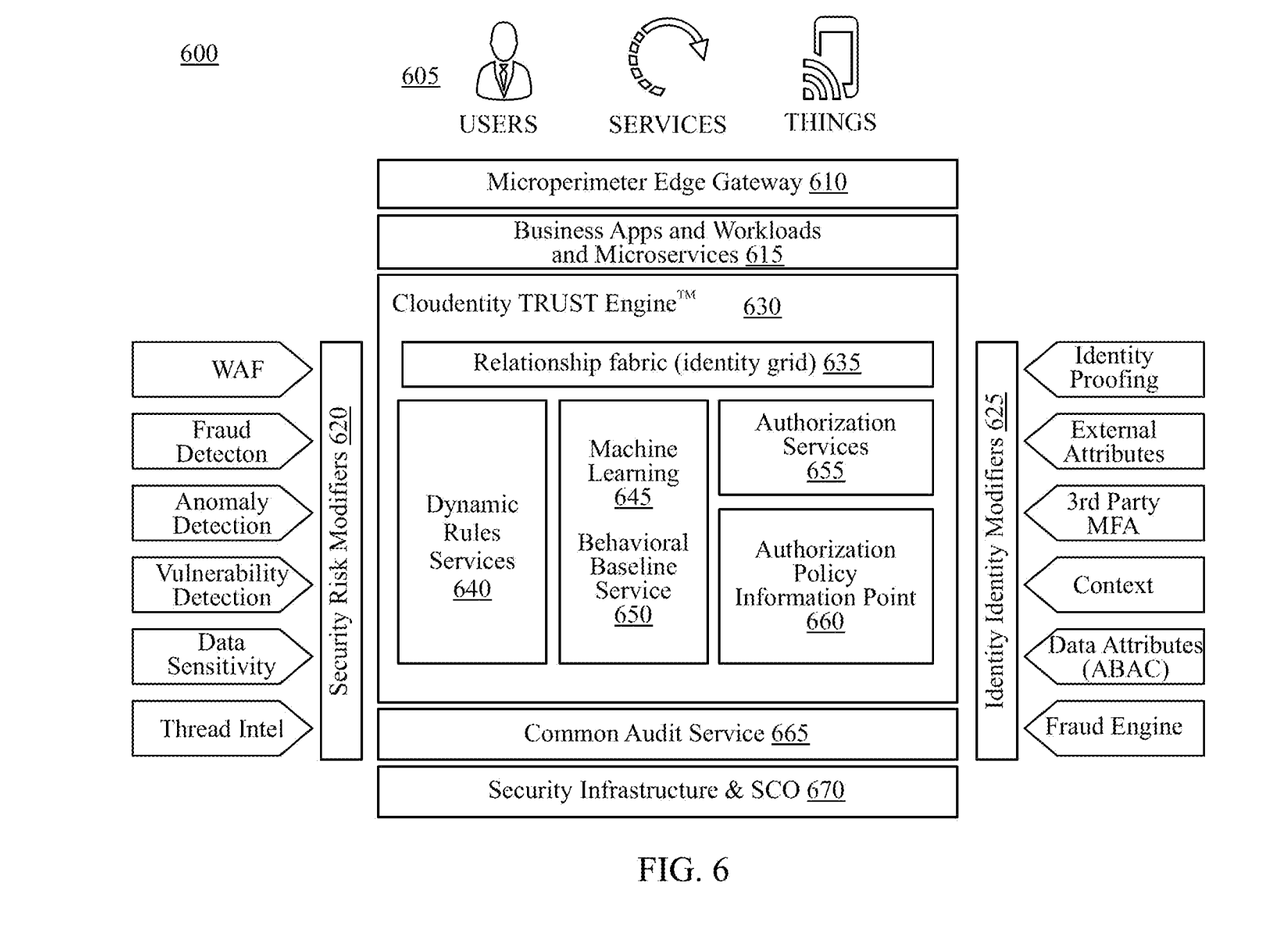
FIG. 6 is a diagram of an exemplary authorization engine that may be used in systems for microservices-based authorization and access management.

FIG. 6 is a diagram of an exemplary authorization engine 600 that may be used in systems for microservices-based identity and access management. An authorization engine 600 (e.g., Cloudentity TRUST Engine™) may be executed to evaluate risks in transactions conducted by various users, services, and things (e.g., IoT devices) 605. Such users/services/things 605 may enter the service mesh via a portal associated with a microgateway 610. The users/services/things 605 may wish to access one or more microservices (e.g., business applications & workloads & microservices) 615, each of which may be associated with different security and authorization policies (described above in relation to FIG. 5) directed at not only granting or denying access, but also evaluating and scoring various attributes for risk. In addition to the specific attributes discussed above, further factors may be considered, including security risk modifiers 620. Such security risk modifiers 620 may be provided from web application firewalls ("WAFs"), fraud detection systems, anomaly detection systems, vulnerability detection systems, data sensitivity systems, and threat intel sources. Further factors may include identity modifiers 625, such as identity proofing systems, external attributes, third party multi-factor authentication ("MFA"), context, data attribute-based access control ("ABAC"), and fraud engines.

Such factors may be received and evaluated by an authorization engine 630, which maintains a relationship fabric (identity grid) 635 for each of the users/services/things 605. Further, the authorization engine 630 may include dynamic rules services 640, machine learning 645, behavioral baseline services 650, authentication services 655, an authorization policy information point 660, and audit services 665. The dynamic rules services 640, machine learning 645, and behavioral baseline services 650 may collectively provide for artificial intelligence (AI") refinement of the rules or policies applied over time as more data and feedback is received. Meanwhile, the authentication services 655 and the authorization policy information point 660 may collectively provide for context-specific risk assessments of specific transaction requests as discussed in further detail below. The audit services 665 may provide each transaction with a comprehensive digitally signed compliance audit trail from authentication to data access via unique individual transaction IDs and verified claims available to applications, microservices, APIs, containers and server-less functions for frictionless fulfillment of governance and compliance requirements.

The relationship fabric (identity grid) 635 refers to an interwoven collection of discrete identity elements for each user that may be collectively used to track and infuse identity attributes (and rights) throughout the distributed infrastructure. As such, the relationship fabric (identity grid) 635 may maintain unique identifiers for each of the users/services/things 605 and may be associated with profile information, such as user names, passwords, contact information, biometric information, user authorization levels, user roles, user behavior metrics, user access history logs (e.g., records of previously accessed resources, circumstances of access, and actions taken), resource protection levels associated with each of the plurality of different protected resources, user-associated devices, etc. The user biometric information may include voice print, a facial image, a retinal image, a fingerprint, a hand print, a signature, or any combination thereof. The respective biometric dataset for a user may be used to verify the user's identity (e.g., as part of a step-up authentication measure used for risk mitigation). Such biometrics and similarly unique parts of the dataset can also be used during the request handling.

The user access history logs may include historical data representing collected information pertaining to a plurality of past transactions associated with the user (of the users/services/things 605). Such history logs may further include identification of the device used for the transaction, geographic location of the device during the access, as well as other contextual information that may be used to further identify the user, the accessing device, and/or assess a risk level for a request to access a particular resource submitted from the user. The user access history logs may also be used to determine access patterns to protected resources by particular users and/or particular devices, as well as to identify resource access permissions previously granted to users along with relevant contextual factors based upon which such resource access permissions were granted. The user behavior information may include data representing a plurality of different user behavior metrics, including access patterns.

In some exemplary embodiments, the profile information may further include device information such as device addresses, device identification numbers, device labels, electronic serial number ("ESN"), an International Mobile Equipment Identity ("IMEI") number, or an mobile equipment identifier ("MEID"), device-print (e.g., based on an ongoing capture of the installed applications/hardware, system settings, device history), device session identifier, device behavior, programs, application data, sensor data; historical data related to device usage by the associated user(s), and any other contextual information. The level of recognition of the device can also be considered part of the risk profile.

The authorization policy information point 660 may store user authorization level information representing a plurality of different policies governing permission to access a protected resource or microservice. Such policies may refer to manner of access, level of trustworthiness, roles, level of protection, and other factors discussed herein. Applying policies in a context-sensitive manner, however, may involve real-time risk profiles/scoring on a transaction basis, as well as step-up authentications on a transactional basis and risk mitigation by combining behavioral baseline and risk attribute decision access control into a non-binary authorization platform. In some embodiments, the authorization engine 630 may also work directly with existing data security appliances to generate real-time (or near real-time) risk profiles based on a combination of identity data and data security data and share such risk profiles globally with other session stores. The authorization engine 630 may also be able to query other external policy decision points, including existing access management platforms and to incorporate contextual data (e.g., location) into the authorization decision. For example, the General Data Protection Regulation ("GDPR") of Europe places limits on what user attributes may be released to the underlying application based on European location(s) where the data resides and/or is transmitted.

For example, a specific requested transaction (e.g., user purchase of an item at a location) may be evaluated and weighed in terms of different attributes (e.g., identity of the user, device used, price of purchase, type of item, user purchase history, location of vendor/seller, location of bank) in order to construct a risk profile. The information in the request may include, for example, unique device identifiers and location data specifying geographic location information. The location data may be utilized to determine or identify locations of the client systems within, for example, a geographic area or a building structure. The location data may be provided by, for example, global positioning system ("GPS") transceivers embedded within the client systems. Different levels of trust may be assigned based on the type and content of information provided, including user location, device identifier, authorization level-request, security monitoring data, user input (e.g., secrets), biometrics, behavior metrics, web-access firewalls, geo-fences, etc. Moreover, such data may be used in risk mitigation as discussed further herein.

A risk profile may be constructed based on such data and may further serve as the basis for specified workflows involving different risk mitigation tasks. A risk profile indicating extremely low risk levels overall (e.g., below a predetermined minimum threshold) may be allowed to proceed without further risk mitigation, while a risk profile indicating extremely high risk levels (e.g., above a predetermined maximum threshold) may be denied notwithstanding any available risk mitigation workflows.

Other risk profiles may be subject to different types of workflows based on the type of risk indicated, as well as the level of that risk. Different thresholds may therefore be set for different risk types and may correspond to different workflows. Such thresholds and workflows may further be customized for the enterprise, as well as updated over time. A risk profile that casts doubt on the identity of the requesting user, for example, may trigger a workflow designed to verify user identity (e.g., passwords, biometric verification), while a different risk profile may attach based on price, location, etc., and trigger a different risk mitigation workflow (e.g., email or phone confirmation). A risk profile may include dynamic risk value/level based on any attributes discussed above, and in response to such levels of risk, the authorization engine 630 may also trigger corresponding workflows to mitigate risk. Applications and/or organizations can set the risk level available to the transactions. That risk level may then be compared to the risk level generated by the behavioral/baseline and existing security devices. Depending on how the risk level aligns with the policy, the policy allows mitigation of that risk through a discrete action, such as audit requests, a multi-factor authentication request, a patch device request, etc. The risk and the corresponding mitigation action can be defined applied to the user, device, thing, or even the service being used during the transaction. Such implementation provides dynamic and non-binary risk assessment and mitigation. In certain transactions, user attributes (e.g., user history) can be used to dynamically authenticate the user for certain access privileges. Workflows may prompt the user and/or the system to change certain statuses to improve the level of authorization for other types of access.

Because historical attributes regarding each transaction may be tracked over time, a behavioral baseline may be established with identified patterns and trends that allow for application of machine learning/AI in evaluation of future risk profiles. As such, authorization policies and their associated workflows may be dynamically refined over time to provide end-to-end security in accordance with context-specific factors.

Figure 7:
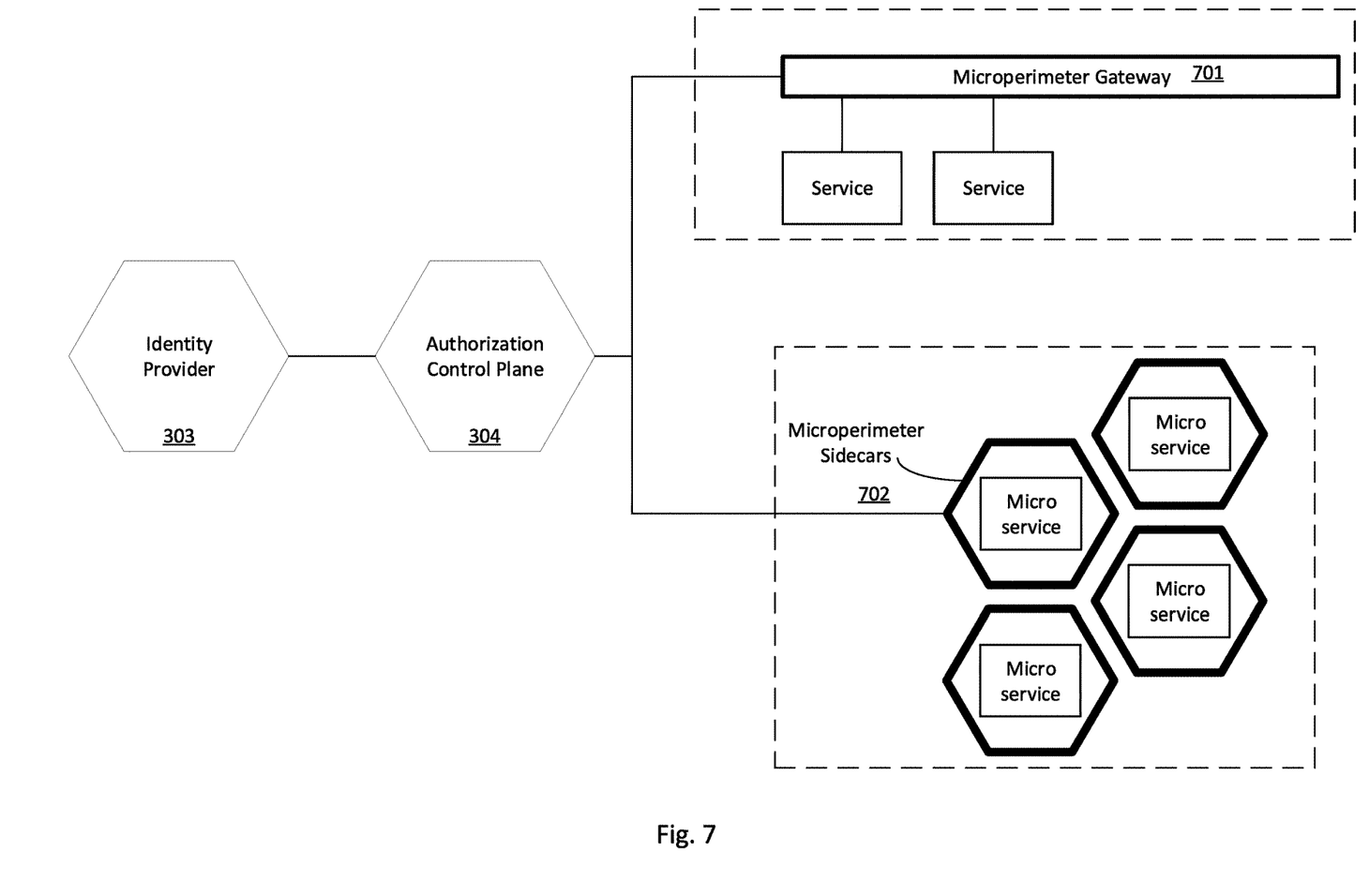
FIG. 7 illustrates different embodiments of the microperimeter authorizer.

FIG. 7 illustrates different embodiments of the microperimeter authorizer 308. The microperimeter authorizer 308 may be deployed in different embodiments, such as a microperimeter gateway, microperimeter sidecars, or packaged Red Hat Package Management ("RPM") plug-ins. Different embodiments of deployment may be used depending on the API infrastructure.

In an embodiment, the microperimeter authorizer 308 may be deployed as a microperimeter gateway 701. In such a case, the microperimeter gateway 701 is plugged into the API gateway. The microperimeter gateway 701 may be plugged into the API gateway as a Java plugin. The microperimeter gateway 701 functions as an API gateway to expose the endpoints as well as provide security to access each endpoint.

In another embodiment, the microperimeter authorizer 308 may be deployed as microperimeter sidecars 702. In this embodiment, each microperimeter sidecars provide security to the respective microservice or APIs as user requests are sent from the authorization control plane 304 to individual microservices or from one microservice to another microservice. Enriched and/or signed token may be passed from one microservice to another microservice, the token signed with a private key assigned to the target microservice.

Users and microservices are described herein are associated with computing devices capable of communicating over known communication networks. Data may be received directly from another computing device or may be received indirectly via one or more intermediary computing devices. Such computing devices may include end-user computing devices (e.g., mobile phones, tablets, laptops, desktop computers), servers, relays, routers, network access points, base stations, and the like.

The components contained in the computing systems performing the methods and functions disclosed herein are those typically found in computer systems that may be suitable for use with embodiments of the present invention and are intended to represent a broad category of such computer components that are well known in the art. Such computing components may include any variety of computing components known in the art, including memory, processors, and network communication interfaces. Further, the present invention may be implemented in an application that may be operable using a variety of devices. Non-transitory computer-readable storage media refer to any medium or media that participate in providing instructions to a central processing unit ("CPU") for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claims.

What is claimed is:

1. A method for dynamic authorization and access management, the method comprising:
   receiving from a client application a request to access requested data accessible via one or more endpoints, wherein the request is transmitted to an identity provider for authentication;
   receiving, from the identity provider, a user authentication based on one or more user attributes;
   defining a scope of access to one or more portions of the one or more endpoints based on user context and one or more security policies, wherein the user context includes the user authentication;
   generating an enriched token based on the authenticated request and the defined scope of access, wherein the enriched token provides the defined scope of access;
   controlling access to the requested data in accordance with the defined scope of access provided by the enriched token, wherein the defined scope of access to each portion of an endpoint is dynamically updated based on one or more modifications to the one or more security policies; and
   providing the enriched token to the client application, the client application using the enriched token to access the requested data in accordance with the scope of access.

2. The method of claim 1, wherein the request to access the requested data is received from a user device, the identity provider requests credentials from the user device and the one or more user attributes comprise the credentials received from the user device.

3. The method of claim 2, wherein the identity provider prompts the user device to enter the credentials.

4. The method of claim 1, further comprising:
   before generating the enriched token, querying an external data source for permission to access the requested data, at least a portion of the requested data being stored by the external data source, the enriched token being generated after the external data source grants permission to access to the requested data.

5. The method of claim 1, further comprising:
   receiving, by a gateway microservice, the enriched token from the client application;
   signing, by the gateway microservice, the enriched token with a first private key to produce a first signed token;
   forwarding, by the gateway microservice, the first signed token to a first microservice in a microservice mesh; and
   the first microservice verifying the first signed token before granting access to first protected information.

6. The method of claim 5, further comprising:
   signing, by the first microservice, the enriched token with a second private key to produce a second signed token;
   calling, by the first microservice, a second microservice in the microservice mesh, the calling of the second microservice comprising forwarding the second signed token to the second microservice; and
   the second microservice verifying the second signed token before granting access to second protected information.

7. The method of claim 1, further comprising:
   generating a user interface to receive and implement the one or more modifications to the one or more security policies.

8. The method of claim 1, wherein the one or more endpoints comprise an Application Programming Interface ("API").

9. The method of claim 8, wherein the one or more security policies comprise different authorization policies for different parts of the API.

10. At least one computing device connected to a user device and an identity provider, the at least one computing device comprising:
    at least one processor; and
    memory storing instructions that, when executed by the at least one processor, communicate with a client application implemented by the user device and implement an authorization control plane that:
    receives an access request from the client application;
    transmits the access request to the identity provider;
    receives user context information from the identity provider;
    generates an enriched token defining a scope of access with respect to one or more endpoints based at least in part on the user context information;
    provides the enriched token to the client application, which uses the enriched token to access data in accordance with the scope of access; and
    wherein the instructions, when executed by the at least one processor, generate a user interface establishing authorization policy for different parts of at least one of the one or more endpoints and the scope of access is updated dynamically by input into the user interface.

11. The at least one computing device of claim 10, wherein before generating the enriched token, the authorization control plane queries an external data source for permission to access the data, at least a portion of the data being stored by the external data source, the enriched token being generated after the external data source grants permission to access to the data.

12. The at least one computing device of claim 10, wherein the one or more endpoints comprise one or more Application Programming Interfaces.

13. The at least one computing device of claim 10, wherein the one or more endpoints comprise one or more microservices.

14. The at least one computing device of claim 10, wherein the one or more endpoints comprise a service on a virtual machine.

15. A method comprising:
    receiving, by a first microservice in a microservice mesh, a first request and an enriched token defining a scope of access with respect to one or more endpoints, the first request having been sent by a client application and requiring access to first and second protected portions of second and third microservices, respectively, in the microservice mesh;
    signing, by the first microservice, the enriched token with a first private key to produce a first signed token;
    forwarding, by the first microservice, the first signed token to the second microservice;
    the second microservice verifying the first signed token before granting access to the first protected portion;

signing, by the second microservice, the enriched token with a second private key to produce a second signed token after the second microservice verifies the first signed token;

calling, by the second microservice, the third microservice, the calling of the third microservice comprising forwarding the second signed token to the third microservice; and the third microservice verifying the second signed token before granting access to the second protected portion.

16. The method of claim 15, wherein the second and third microservices are executed by a common Application Programming Interface.

17. The method of claim 16, further comprising:
receiving an access request from the client application;
transmitting the access request to an identity provider;
receiving user context information from the identity provider;
generating the enriched token defining the scope of access with respect to the one or more endpoints based at least in part on the user context information; and
forwarding the first request and the enriched token to the first microservice.

18. The method of claim 15, wherein the first and second protected portions each comprise protected information.

19. The method of claim 15, wherein one or both of the first and second protected portions comprise a service on a virtual machine.

* * * * *